Patented June 12, 1928.

1,672,928

UNITED STATES PATENT OFFICE.

GEORGE A. BUVINGER AND CLARENCE WARNER, OF DAYTON, OHIO, ASSIGNORS TO DELCO-LIGHT COMPANY, OF DAYTON, OHIO, A CORPORATION OF DELAWARE.

PUMPING APPARATUS.

Application filed April 7, 1923. Serial No. 630,638.

This invention relates to lift pumps, and more particularly to the type of lift pump which is adapted to pump water from a deep well. Such a pump generally comprises a pump cylinder located adjacent the bottom of the well, a pump rod extending upwardly above the well casing, and a pump driving mechanism or power head for reciprocating the rod. It is among the objects of the present invention to provide improvements in the construction of the power head tending to economy in manufacture, efficiency in operation, and compactness in structure.

Other and further objects and advantages of the present invention will be apparent from the following description of a preferred form thereof, reference being made to the accompanying drawings.

Figure 1:
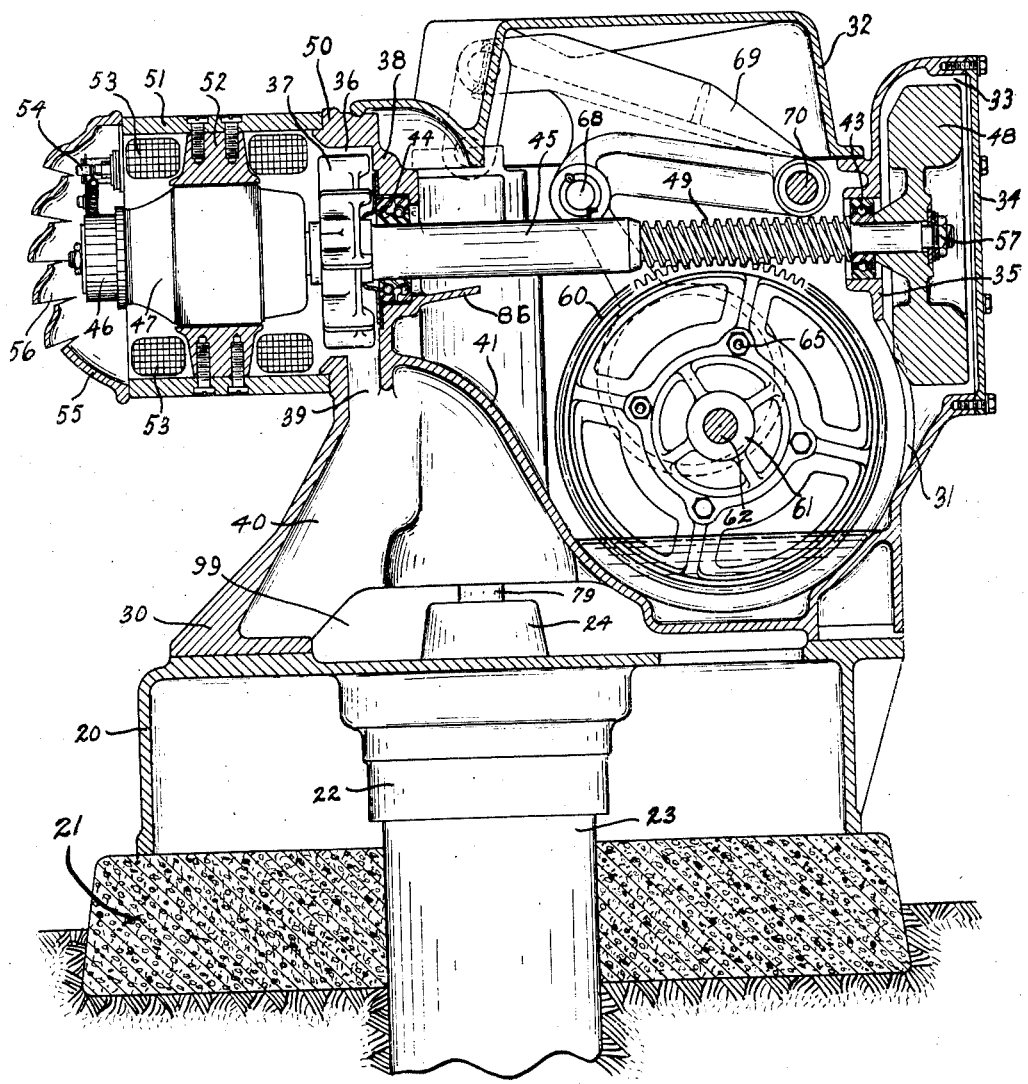
Fig. 1 is a sectional view of a power head embodying the present invention.

In the drawings, 20 designates a base mounted on a concrete foundation 21. The base is provided with a downwardly extending annular flange 22 for receiving the end of a well casing 23. The base supports a coupling member 24 internally threaded to receive a bushing 25 screw-threaded on a hanger pipe 26 which is used to remove certain underground parts of the pump mechanism, as shown in the copending application of George A. Buvinger and Clarence Warner, Serial No. 626,173, filed March 19, 1923.

The power head includes a frame 30 which is shaped to provide a gear case 31 having a cover 32, and a flywheel housing 33 having a cover 34 which is partly separated from the gear case 31 by downwardly extending wall 35. The frame 30 provides a housing 36 for a fan 37, housing 36 being separated from gear case 31 by a wall 38. Housing 36 is connected by air passage 39 with an air passage 40 located below and to the side of a wall 41 of the gear case 31.

The walls 35 and 38 support respectively bearings 43 and 44 for a shaft 45 which overhangs both of the walls 38 and 35. Shaft 45 supports motor commutator 46, armature 47, fan 37, on one overhanging portion, a flywheel 48 on the other overhanging portion, and shaft 45 is provided intermediate the bearings with a worm 49.

The frame 30 is provided with a mounting boss 50 arranged concentric to the shaft 45 for mounting thereon the field frame 51 of the motor which supports pole pieces 52, windings 53, a motor brush rigging 54, and an end cover 55 provided with ventilating openings 56.

Removing the cover 34 from flywheel housing 33 permits removal of the nut 57 and then removal of the flywheel 48. The motor field frame 51 can be removed from the frame 30. After that the shaft 45 can be removed from the frame 30 with the remaining parts supported thereby all in assembled relation.

The worm 49 meshes with a worm gear 60 having a hub 61 which is loosely mounted on a rod 62 supported by the walls of the gear case 31, and removable endwise from the gear case to permit removal of the gear 60. An eccentric 63 is secured to the gear 60 by bolts 64 and nuts 65 and drives an eccentric strap 66 having a connecting rod or link 67 attached by a pin 68 with the pump lever or walking beam 69. Beam 69 is pivotally mounted at one end upon a pin 70 supported by the walls of gear case 31 and removable endwise therefrom. The free end of beam 69 is connected by pin 71 with link 72 which is pivotally attached to a sleeve 73 attached to a crosshead guide 74 by means of bolts 75 and nuts 76. The head 77 of bolt 75 supports a bushing 78 threaded on pump rod 79. Crosshead 74 reciprocates within a crosshead guide 80 formed integrally with the frame 30.

An opening 81 is provided in a wall of the gear case 31 in order that the pump rod may extend within the power head. Opening 81 is surrounded by an upwardly extending annular flange 82 around which lubricating oil may collect after dripping from the crosshead guide 80, this flange 82 preventing escape of oil from the power head down into the well. Operation of the motor causes the shaft 45 to turn, and the worm 49 to drive the worm gear 60. Gear 60 rotates the eccentric 63, causing the strap 66 and link 67 to oscillate the walking beam 69, and the pump rod 79 to be reciprocated.

Lubrication for the moving parts of the power head is provided by the gear 60 splashing in a quantity of lubricating oil 85 located in the gear case 31. Oil will be carried to worm shaft 49 which splashes it to provide the bearings 43 and 44 with lubrication. A shelf 86 is provided on the wall 38 in order to catch oil for the bearing 44.

From the upper surface 90 of the walking beam 69, there extend two ribs 91 which are spaced and connected also by a web 92. This construction provides the walking beam 69 with two oil pockets 93 and 94 for receiving a quantity of oil splashed by the worm 49. The top wall of cover 32 is provided on its interior with a downwardly extending rib 95 to assist in directing oil splashed against the interior of cover 32 down into the pockets 93 and 94. Oil will flow from the pockets 93 and 94 respectively to the oil holes 97 and 98 to lubricate the bearing surfaces at the pins 70 and 71 respectively. In its upper position, the crosshead 74 is exposed as shown in Fig. 2, consequently its exposed surface will receive a coating of lubricating oil for lubricating the crosshead guide 80.

To disassemble the transmission mechanism, the motor shaft is removed in the manner described. The cover 32 is removed, and the pins 70 and 62 are removed endwise from the frame 30. The pin 71 is removed from beam 69 and link 72. Then the beam 69, eccentric strap 66, eccentric 63, and gear 60 can be removed from the gear case 31. The nuts 76 are removed, permitting the crosshead 74 to be disconnected from the pump rod 79.

During operation of the motor, the fan 37 circulates air between the motor and the air passage 40, through the opening 39. The air passage 40 communicates with the opening 99 provided between the frame 30 and the base 20.

Figure 2:
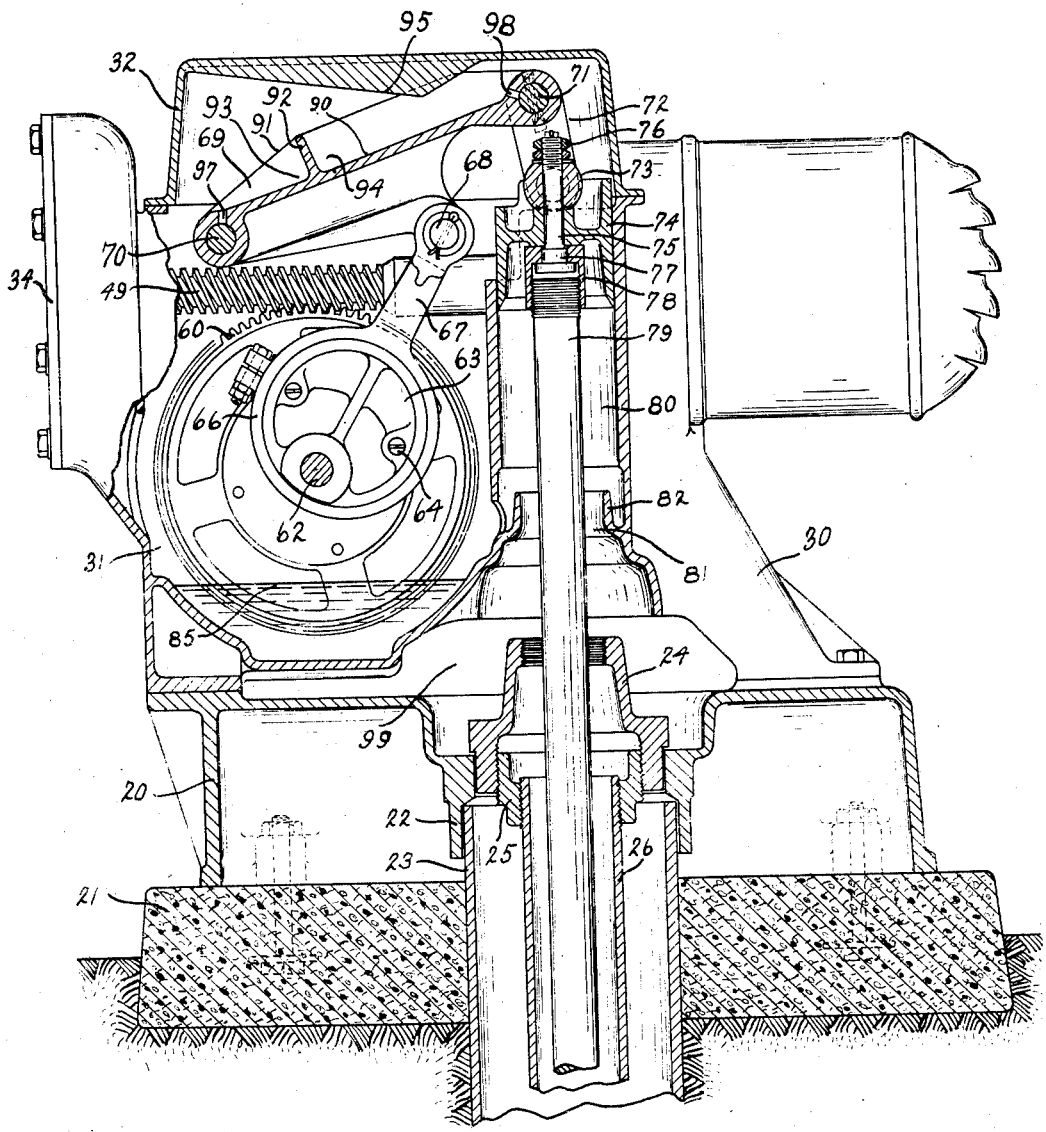
Fig. 2 is a side view partly in section, the view being taken from the opposite side of the pump as shown in Fig. 1.

Referring especially to Fig. 2, it will be noted that the transmission mechanism from the motor shaft to the crosshead has not been arranged in the conventional fashion wherein the motion of the crosshead with respect to the crank or eccentric which causes it to reciprocate is approximately a relationship governed by the law of simple harmonic motion. The pin 68 instead of being in alignment with the pins 70 and 71 is located a substantial distance to one side of the center line connecting pins 70 and 71, and the shaft 62, instead of being located vertically under the connection between the eccentric strap and walking beam, is located in a vertical plane which is somewhat closer to the vertical plane of the axis of pin 70 than to the vertical plane of the axis of pin 68. This arrangement of parts tends toward compactness of arrangement enabling the use of a smaller gear housing.

While the form of mechanism herein shown and described constitutes a preferred embodiment of one form of invention, it is to be understood that other forms might be adopted and various changes and alterations made in the shape, size, and proportion of the elements therein without departing from the spirit and scope of the invention.

What is claimed is as follows:

1. In a pump driving mechanism, a unitary structure comprising the combination with a frame having a fan chamber, a flywheel chamber, an intermediate gear chamber and an air passage located below the fan chamber; of a shaft extending through said fan, flywheel and gear chambers; a fan mounted on the shaft in the fan chamber; a flywheel mounted on the shaft in the flywheel chamber; a motor mounted on said frame including an armature mounted on said shaft; a crosshead mounted for reciprocation upon said frame and mechanism within the gear chamber for connecting the shaft and crosshead.

2. In a pump driving mechanism, a unitary structure comprising the combination with a frame having a fan chamber, a flywheel chamber, an intermediate gear chamber and an air passage located below the fan chamber; of a shaft extending through said fan, flywheel and gear chambers; a fan mounted on the shaft in the fan chamber; a flywheel mounted on the shaft in the flywheel chamber; a motor mounted on said frame including an armature mounted on said shaft; and mechanism within the gear chamber for connecting the shaft with a pump rod extending within the gear chamber.

3. In a pump driving mechanism, a unitary structure comprising the combination with a frame having a fan chamber, a flywheel chamber, a gear chamber and an air passage; of a fan in the fan chamber; a flywheel in the flywheel chamber; pump operating mechanism in the gear chamber; and a prime mover for driving the fan, flywheel and mechanism.

4. In a pump driving mechanism, a unitary structure comprising the combination with a frame having a fan chamber, a flywheel chamber, a gear chamber disposed intermediate the fan and flywheel chamber; of a fan in the fan chamber; a flywheel in the flywheel chamber; a pump operating mechanism within the gear chamber; and a prime mover for driving the fan, flywheel, and mechanism.

In testimony whereof we hereto affix our signatures.

GEORGE A. BUVINGER.
CLARENCE WARNER.